United States Patent [19]

Harada et al.

[11] Patent Number: 4,614,257
[45] Date of Patent: Sep. 30, 1986

[54] SPRING COUPLER APPARATUS

[75] Inventors: Kuniyoshi Harada, Takahama; Yukifumi Yamada, Nagoya, both of Japan

[73] Assignee: Aisin Seiki Company, Ltd., Japan

[21] Appl. No.: 563,378

[22] Filed: Dec. 20, 1983

[30] Foreign Application Priority Data

Dec. 26, 1982 [JP] Japan ............................ 57-232689

[51] Int. Cl.⁴ .......................................... G05G 5/16
[52] U.S. Cl. .................................... 192/8 C; 49/350; 188/77 W; 188/82.6
[58] Field of Search ................ 192/8 C; 49/348, 350, 49/351; 188/77 W, 82.6

[56] References Cited

U.S. PATENT DOCUMENTS 1,874,215  8/1932  Ackerman et al. ............... 192/8 C
2,285,027  6/1942  Gates ............................... 192/8 C
3,110,380  11/1963  Meyer et al. ..................... 192/8 C Primary Examiner—Allen D. Herrmann
Attorney, Agent, or Firm—Finnegan, Henderson, Farabow, Garrett & Dunner

[57] ABSTRACT

Spring coupler apparatus including a driving member and a driven member coaxially mounted in a case, the driving member including a substantially circular annular body having a pair of fan-shaped flanges extending diametrically therefrom with upstanding portions at the end of the flanges forming recesses therebetween, and the driven member also including a pair of diametrically opposed fan-shaped flanges with projections extending upwardly from the ends thereof into the recesses. A relatively larger diameter spring is wrapped around the upstanding portions and projections and is in frictional engagement of the outer wall of the case in the free state of the spring, one tang end of the spring being engaged in a slit in one of the projections, and a tang on the free end of the spring being engageable with one of the upstanding portions of the driving member. A relatively smaller diameter spring is wrapped around an inner wall of the casing between the inner wall and the inner surfaces of the upstanding portions and the projections, the smaller diameter spring being in frictional engagement with the inner wall in the free state of this spring. An outturned tang on one end of smaller diameter spring is engaged with a slit in the other of the upstanding portions of the driven member and an outturned tang on the free end of the smaller diameter spring is engageable with the other one of the projections.

8 Claims, 5 Drawing Figures

SPRING COUPLER APPARATUS

FIELD OF THE INVENTION

The present invention relates to spring coupler apparatus, and more particularly to spring coupler apparatus for controlling the transmission of rotation.

BACKGROUND OF THE INVENTION

In a conventional spring coupler apparatus 10, as shown in FIGS. 1 and 2, a drive member 11 is provided within a case 14 and a driven member 12 has a projecting portion 12a disposed through a recessed portion 11a formed in the driving member 11. A spring 13 is interposed between the case 14 and the drive member 11 and contacts the inner wall of the case 14 by frictional force. When the drive member 11 is rotated counterclockwise, as shown, the drive member 11 engages one end 13a of the spring 13, and when the drive member 11 is rotated clockwise, the drive member 11 engages other end 13b of the spring 13. Accordingly, the spring 13 is contacted by engaging the driving member 11 and the contacting relation of the spring 13 with the inner wall of the case 14 is removed. Thus when the drive member 11 is rotated in either direction, the frictional relationship of the spring 13 with the inner wall of the case 14 is broken. Thereafter, the recessed portion 11a of the drive member 11 and the projecting portion 12a of the driven member 12 are engaged by the constriction of the spring 13 and the rotation of the drive member 11 is transmitted to the driven member 12.

When the driven member 12, however, is rotated individually in either the clockwise or counterclockwise direction, the drive member contacts either end portion 13a or 13b of the spring 13. Accordingly, the spring 13 is expanded and the frictional force between the spring 13 and the inner wall of the case 14 is increased and any rotation of the driven member 12 is blocked. That is to say, the rotation of the driven member 12 is not transmitted to the drive member 11 and the driven member 12 stays at its previous position.

In this type of conventional apparatus it is indispensable to have sufficient space between the recessed portion 11a of the drive member 11 and the projecting portion 12a of the driven member 12 in order to release the contact of the spring 13 from the inner wall of the case 14 by contraction of the spring when the drive member contacts one end of the spring. In short, if the space is insufficient, the drive member 11 directly engages the driven member 12 and the diameter of the spring 13 is expanded by the driven member 12. The contact of the spring 13 with the inner wall of the case 14 is therefore not released and the drive member 11 cannot rotate. For this reason the driven member 12 is interposed in the space between the end portions 13a and 13b of the spring 13 and the driven member 12 is required to be tiltably rotated in the recess 11a. This tolerance between the driven member 12 and the drive member 11 causes an up and down looseness of the window glass in a window regulator apparatus and of the seat in a seat height adjusting apparatus, when this type of spring coupler is so used. This not only invites discomfort for passengers but also damages the image of the vehicles as perceived by possible purchasers.

SUMMARY OF THE INVENTION

An object of the present invention is, therefore, to provide an improved spring coupler apparatus which obviates the aforementioned drawbacks of conventional spring coupler apparatus.

A further object of the present invention is to provide an improved spring coupler apparatus which can be reliably operated.

A still further object of this invention is to provide an improved spring coupler apparatus which is relatively simple and includes a minimum number of parts.

BRIEF DESCRIPTION OF THE DRAWINGS

Various other features, objects and attendant advantages of the present invention will become self-evident when considered in connection with the accompanying drawings wherein.

DETAILED DESCRIPTION OF THE PREFERRED EMBODIMENT

Figure 1:
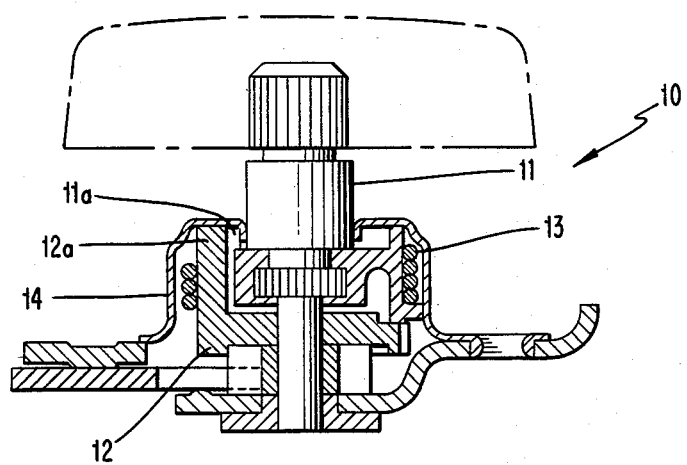
FIG. 1 is a front view which shows a conventional spring coupler apparatus.
Figure 2:
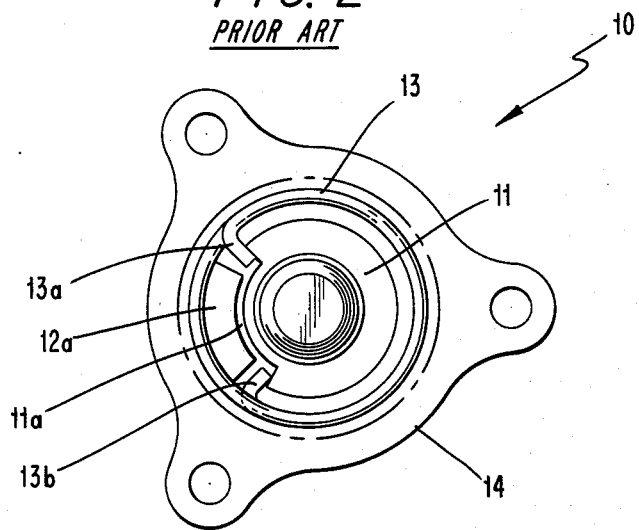
FIG. 2 is sectional view of the apparatus of FIG. 1.
Figure 3:
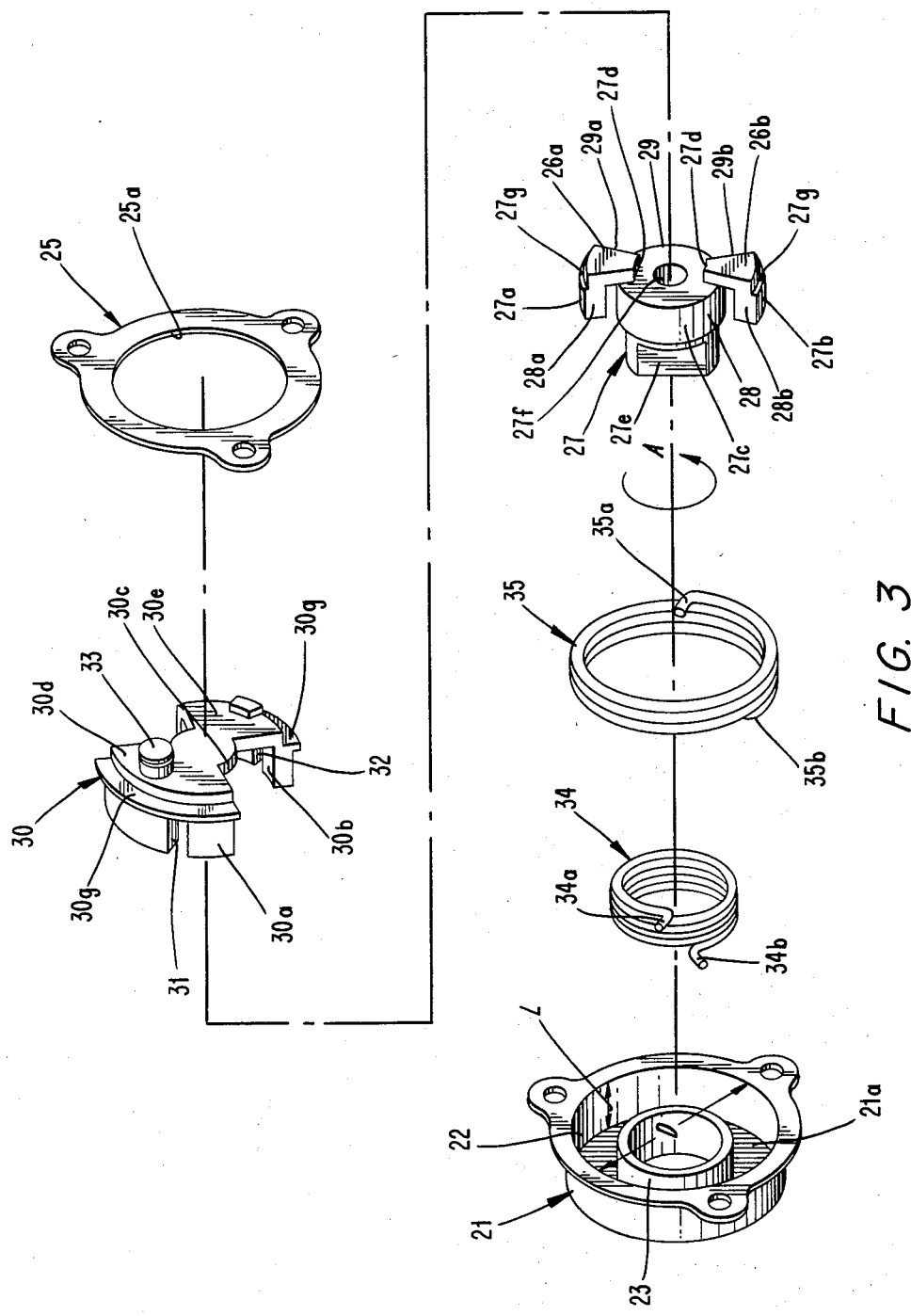
FIG. 3 is an exploded view of a preferred embodiment of a spring coupler apparatus according to the present invention.
Figure 4:
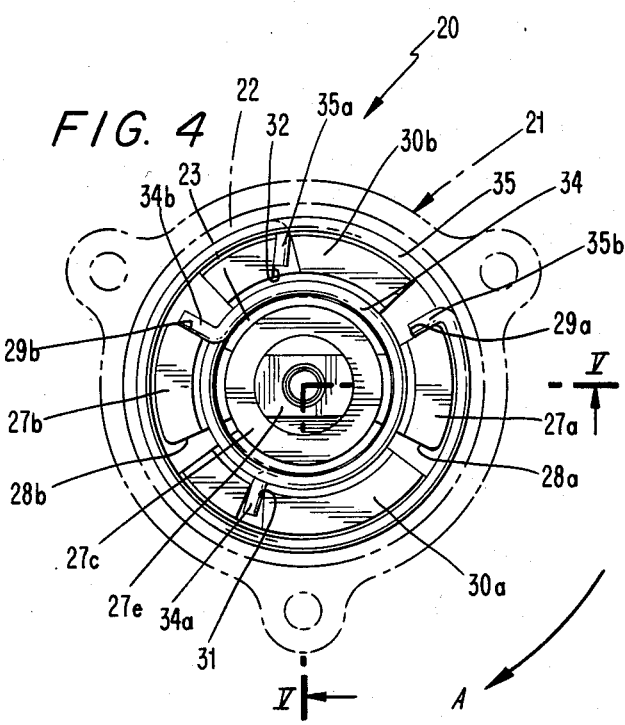
FIG. 4 is a front view showing the engaged state of the coupler apparatus of FIG. 3.
Figure 5:
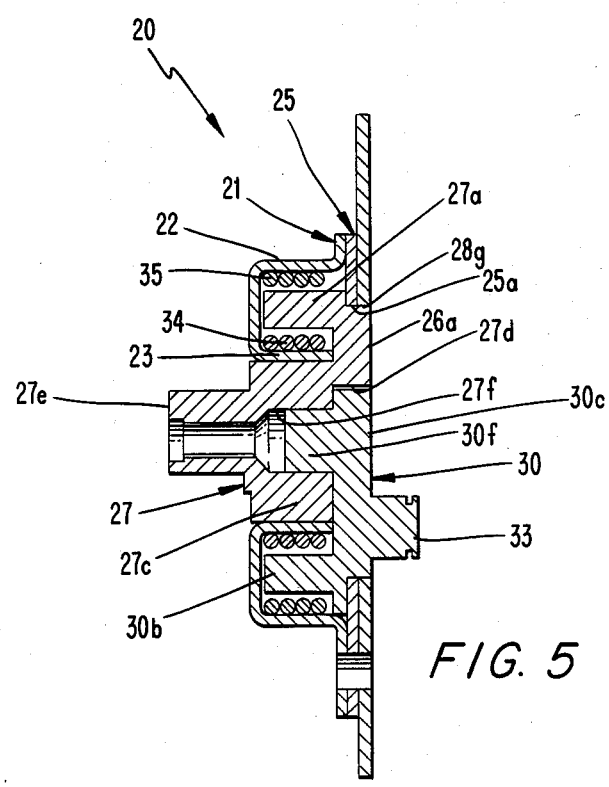
FIG. 5 is a sectional view taken along the line V—V in FIG. 4.

Referring now to FIGS. 3, 4, and 5, a spring coupler apparatus 20 is comprised of a case 21, a base plate 25 attached to the case 21, a handle shaft support 27, acting as the drive member, disposed within a space formed by the case 21 and the base plate 25, a driven plate 30, a coil spring 34 of relatively small diameter and a coil spring 35 of relatively large diameter.

The case 21 is open at the right end as shown, and has a circular housing (cylindrical outer wall) 22 and a circular support frame (concentric inner wall) 23 joined by a planar central end face 21a. The base plate 25 is fixedly attached on the open end of the case 21. The base plate 25 is annular forming an axial opening 25a coaxial with the outer wall 22, which extends a predetermined length L measured along the axis of the case 21. The area occupied by the case is substantially defined by the diameter D of the outer wall 22 and the predetermined length L.

The handle shaft support 27 includes a cylindrical portion 27c of annular cross section rotatably mounted within the inner circumferential face of the inner wall 23. The handle shaft support 27 is moreover rotatably supported by a pair of arcuate stepped portions 27g formed on a pair of fan-shaped flanges 26a and 26b extending diametrically from the cylindrical portions 27c. Arcuate portions 27a and 27b coaxial to the cylindrical portion 27c upstand on the flanges 26a and 26b on opposite sides of the cylindrical portion 27c forming recesses 28 and 29 between the upstanding portions. The upstanding arcuate portions 27a and 27b are interposed between the outer and inner walls 22 and 23 of the case 21 with space between the arcuate portions and the walls.

The handle shaft support 27 also includes a cylindrical portion 27e of annular cross section upstanding from and coaxial with the cylindrical portion 27c, the cylindrical portion 27e extending outwardly beyond the end face 21a of the case 21. The inner opening in the cylindrical portion 27e forms an axial hole dimensioned to receive securely and support the shaft of a crank handle (not shown), the crank handle extending into the inner opening 27f of the annular cylindrical portion 27c. The rotation of the crank handle therefore rotates the handle shaft support 27 as the driving member of the spring coupler.

The driven plate 30, rotating with the handle shaft support 27, has a substantially circular main body 30c, an axial portion 30f coaxially formed on the left side of the main body 30c, (as shown), and a pair of diametrically opposed fan-shaped flanges 30d and 30e formed on the right side. The axial portion 30f is firmly set into the axial hole 27f of the circular portion 27c of the handle shaft support 27 and forms the inner end of the opening for receiving the handle shaft.

The flange portions 30d and 30e lie in the recesses 28 and 29, respectively, formed between the flanges 26a and 26b of the handle shaft support 27. An arcuate stepped portion 30g is formed on each of flanges 30d and 30e. The stepped portions 30g complete a circular shoulder with the stepped portions 27g supported by the axial opening 25a in the base plate 25. Coaxial arcuate projections 30a and 30b extend upwardly from flanges 30d and 30e, respectively, of the plate 30 into the recesses 28 and 29, respectively, and are interposed between the outer and inner walls 22 and 23 of the case 21 with space between the projections and the walls and space between the ends of the projections and the end faces 28a, 28b of the upstanding portions 27a, 27b facing the recess 28 and the end faces 29a, 29b of the upstanding portions 27a, 27b facing the recess 29. The circumferential spaces between the end faces 28a and 28b and the projection 30a are smaller than the circumferential spaces between the end faces 29a and 29b and the projection 30b. Each of the projections 30a, 30b contains a slit 31, 32, respectively. When the handle shaft support 27, i.e., the driving member, is rotated, therefore, one or the other of the end faces 28a, 28b is contacted by the projection 30a through the smaller circumferential spaces.

The arcuate projections 30a, 30b, are positioned radially inward from the free ends of the fan-shaped flanges 30d, 30e, respectively, and together with the upstanding portions 27a, 27b retain the coil spring 35 of a large diameter between them and the outer wall 22.

An output knob 33 is formed on a right end face of the plate 30, as shown, and projects outwardly through the opening 25a in the base plate 25.

Accordingly, when the handle shaft support 27 is rotated, the plate 30 is also rotated after only a short movement of a handle crank. Likewise, rotation of the output knob 33 on the plate 30 will rotate the handle shaft support 27 if there is no preventative braking.

The coil spring 35 of larger diameter and the coil spring 34 of smaller diameter are coaxially arranged, respectively, between the sides of the outer and inner circumferences of the upstanding portions 27a and 27b of the driving handle shaft support 27 and the projections 30a and 30b of the driven plate 30 and the outer and inner walls 22, 23 of the case 21.

The outer diameter of the larger diameter coil spring 35 is larger than the diameter of the inner circumferential surface of the outer wall 22 in the free state of the spring, so that this spring contacts the inner circumferential surface of the outer wall by frictional force. Likewise, the inner diameter of the smaller coil spring 34 is smaller than the diameter of the outer (with respect to the axis) circumferential surface of the inner wall 23 in the free state of the spring so that the spring 34 contacts the outer circumferential surface of the inner wall 23 by frictional force.

The coil spring 35 of larger diameter is bent inwardly at both ends thereof to form tangs 35a and 35b. The tang 35a is engaged with the slit 32 of the projection 30b of the plate 30 and the tang 35b is engaged with the end face 29a of the upstanding portion 27a facing the recess 29. The spring 35 is so mounted as to wind around the outer circumferential surface of the upstanding portion 27a of the handle shaft support 27 just before the tang 35b engages the end face 29a.

The coil spring 34 of smaller diameter is outwardly bent at both ends thereof to form tangs 34a and 34b. The tang 34a is engaged with the slit 31 of the projection 30a of the plate 30 and the tang 34b is engaged with the end face 29b of the upstanding portion 27b also facing the recess 29. The spring 34 is mounted so that it does not wind around the upstanding portion 29b just before the tang 34b engages the end face 29b. The tang 34b instead abuts the end face 29b. Therefore, the tangs 34b and 35b of the coil springs 34 and 35 are engaged with, respectively, the end faces 29b and 29a but conversely located as to the rotational direction of the handle shaft support 27. On the other hand, the tangs 34a and 35a are securely fixed in slits in the driven member, plate 30, so that any tendency of the knob 33 to rotate the plate 30 immediately actuates both springs.

When the handle shaft support 27 is rotated in the arrow direction A, i.e., clockwise, the end face 29b facing the recess 29 of the handle shaft support 27 immediately acts against the abutting tang 34b of the coil spring 34 and the coil spring 34 is expanded by further rotation of the handle shaft 27. However, the end face 29a is drawn away from the tang 35b of the coil spring 35. When the handle shaft support 27 is conversely rotated to the arrow direction A, i.e., counterclockwise, the end face 29a immediately acts against the engaged tang 35b of the coil spring 35 and the spring is contracted by further rotation of the handle shaft support 27. However, the end face 29b is drawn away from the tang 34b of the coil spring 34, so that coil spring 34 is not affected.

If the driven plate 30 tends to be rotated by the output knob 33 clockwise, the coil springs 34 and 35 are tightened by the tangs 34a and 35a which are engaged in the slits 31 and 32, respectively, of the plate 30, the smaller spring 34 engaging the inner wall 23 by frictional force. When the plate 30 tends to be rotated clockwise by the knob 33 both coil springs 34 and 35 are expanded, the larger spring 35 engaging the outer wall 22 by frictional force. Thus any tendency of the knob 33 to initiate counter movement of the coupler is braked and oscillation of the plate 30 by the output knob is minimized.

FIG. 3 shows the free state of both coil springs 34 and 35, in which the tangs 34a, 34b, 35a, 35b of the springs do not correspond exactly respectively to the slits 31 and 32 of the plate 30 and to the end faces 29a and 29b facing the recess 29 of the handle shaft support 27.

The operation according to the present invention is as follows:

When the handle (not shown) is rotated, the handle shaft support 27 is rotated within the case 21 through the cylindrical portion 27e securing the handle. The upstanding portions 27a and 27b of the handle shaft support 27 are freely and independently rotated with respect to the plate 30 within the limitations of the recesses 28 and 29. Accordingly, when the handle shaft support 27 is rotated in the arrow direction A, the end face 29b of the handle shaft support 27 acts upon the abutting end portion 34b of the coil spring 34 of the smaller diameter and spring 34 is expanded upon further clockwise rotation of the handle shaft support by the urging force of the end portion 34b of the coil spring 34 against the winding up direction. Therefore, the frictional contact of the coil spring 34 with the outer circumferential face of the inner wall 23 of the case 21 is released. On the other hand, end face 28a of the handle shaft support 27 contacts the upstanding portion 30a of the plate 30. The plate 30 is thereby rotated in the arrow direction, so that the end portion 35a of the coil spring 35 of the large diameter engaged with the slit 32 of the plate 30 is urged into the winding direction. Therefore, the coil spring 35 is contracted and the contact of the coil spring 35 with the inner wall face of the outer wall 22 of the case 21 is released. As a result, the plate is rotated along with the handle shaft support 27 by the rotation of the handle, when the handle shaft support 27 is rotated in the arrow direction A.

When the handle is conversely rotated to the arrow direction A, the end face 29a of the handle support shaft 27 acts upon the engaged end portion 35b of the coil spring 35 and the coil spring 35 is contracted upon further counterclockwise rotation of the handle shaft 27 by the urging force of the coil spring 35 into the winding direction. Therefore, the contact of the coil spring 35 with the inner circumferential face of the outer wall 22 of the case 21 is released. The end face 28b of the handle shaft support 27 contacts the projection 30a of the plate 30. The plate 30 is then rotated counterclockwise with the handle shaft support 27, and the tang 34a of the coil spring 34 engaged in the slit 31 of the plate 30 is rotated against the winding direction. Therefore, the coil spring 34 is expanded and the contact of the case 21 with the outer circumferential face of the inner wall 23 of the case 21 is released. Accordingly, the plate 30 is rotated with the handle shaft support 27 by the rotation of the handle conversely to the arrow direction A.

The plate 30 is rotated according to either direction of the rotation of the handle, and rotation of the handle would be produced by rotation of the output knob 33 of the plate 30 except for the braking action of the invention. Each one of the tangs 34a and 35a of the coil springs 34 and 35 is engaged with a slit 31 or 32 of the plate 30. Accordingly, when the knob 33 tends to be rotated in the arrow direction A, both coil springs 34 and 35 are contracted by the urging in the winding direction. Although the contact of the coil spring 35 with the inner circumferential surface of the outer wall 22 of the case 21 is released, the contact of the coil spring 34 with the outer circumferential face of the inner wall 23 of the case 21 is maintained and increased. When the knob 33 tends to be rotated oppositely to the arrow direction A, both coil springs 34 and 35 are expanded against the winding up direction. The contact of the coil spring 34 with the outer circumferential face of the inner wall 23 of the case 21 is released, but the contact of the coil spring 35 with the inner circumferential face of the outer wall 22 of the case 21 is maintained and increased. The contact of one of the coil springs 34 and 35 with the outer circumferential face of the inner wall 23 or with the inner circumferential face of the outer wall 22 is always maintained, whether the plate 30 is rotated in one direction or the other. Accordingly, the rotation of the plate 30 is blocked, even if there is pressure tending to rotate the plate 30 through the knob 33, so that the handle shaft support 27 is not rotated along with the plate 30. The contact of one or the other of coil springs 34 and 35 with the case 21 is maintained and increased, so that the plate 30 cannot act as the driving member.

The outer wall 22 and the inner wall of the case 21 are coaxially located and the coil springs 35 and 34 contact with the inner circumferential face of the outer wall 22 and the outer circumferential face of the inner wall 23, respectively. Accordingly, both coil springs 34 and 35 are located coaxially but tend to act in a line so that any oscillating movement of the plate 30 is eliminated without the necessity of two larger springs acting in the rotational direction.

By the foregoing, there has been disclosed a preferred form of spring coupler apparatus constructed in accordance with the present invention. It will be appreciated that various additions, substitutions, modifications and omissions may be made thereto without departing from the spirit of the invention.

What is claimed is:

1. A spring coupler apparatus comprising:
   a case having a circular housing extending a predetermined length measured along the axis of said housing, a circular support frame positioned radially inward from said housing and extending along a substantial portion of said predetermined length of said housing, said housing and said support frame concentrically aligned along a plane extending perpendicular to the axis of said housing, said case further including a sidewall connecting said housing and said support frame along said plane, wherein the area occupied by said case is substantially defined by the diameter of said housing and said predetermined length;
   drive means supported within said case along the length of said support frame, said drive means having a recess area;
   driven means disposed within said case and having a projection extending into said recess area for rotational alignment with said drive means;
   a first coil spring of relatively large diameter mounted between said housing and said support frame and having frictional engagement with said housing in the free state of the first spring, one end of said first spring being securely fixed to said driven means and the other end of said first spring being engageable with said drive means for contracting said first spring and freeing its frictional engagement with said housing in a first direction of rotation of said drive means; and
   a second coil spring of relatively small diameter mounted between said housing and said support frame and having frictional engagement with said support frame in the free state of said second spring, one end of the said second spring being securely fixed to said driven means and the other end of said second spring being engageable with said drive means for expanding said second spring and freeing its frictional engagement with said support frame in a second direction of rotation of said drive means.

2. The spring coupler apparatus of claim 1 wherein said case includes attaching means having a circular shoulder portion extending radially outward from said housing and wherein said drive means includes a substantially circular annular portion having a central opening for receiving a handle in the upper end thereof, a pair of fan-shaped flanges extending diametrically from the lower end of said annular portion, a pair of upstanding portions formed on the outer ends of said flanges coaxial with said annular portion, said recess area extending between said upstanding portions of said diametrically opposed flanges.

3. The spring coupler apparatus of claim 2 wherein said driven means includes a substantially circular main body and a pair of fan-shaped members extending diametrically from said main body, and wherein said projection extends upwardly from said main body to be coaxial with said annular portion.

4. The spring coupler apparatus of claim 3 wherein said upstanding portions of said drive means form a pair of diametrically opposed recesses and wherein said fan-shaped members include a pair of extensions extending individually into said pair of recesses.

5. The spring coupler apparatus of claim 4 wherein said first spring encircles said upstanding portions and said extensions and is in frictional contact therewith for driving said driven member in the contacted state of said first spring and wherein said second spring is in frictional contact with said upstanding portions and said extensions in the expanded state of second spring.

6. The spring coupler apparatus of claim 5 wherein both of said extensions of said driven means includes a substantially radial slit and wherein each end of said first spring has an inwardly turned tang, one of said inward tangs being inserted into the slit of one of said extensions of said driven means, and wherein each end of said second spring has an outwardly turned tang, one of said outward tangs being inserted into the slit of the remaining one of said projections of said driven means.

7. The spring coupler apparatus of claim 6 wherein said first spring is mounted around said upstanding portions and said extensions and the free end of said first spring is positioned into engagement with one of said upstanding portions in the free state of said first spring, whereby the movement of said drive means into continued engagement in said first direction immediately contracts said first spring, and wherein said second spring is mounted around said support frame and within said upstanding portions and said projections, and wherein said outward tang on the free end of said second spring is positioned into engagement with the remaining one of said upstanding portions in the free state of said second spring whereby the movement of said drive means in said second direction expands said second spring.

8. The spring coupler apparatus of claim 7 wherein the expansion and contraction of said first and second springs relative to each other is substantially linear.

* * * * *